United States Patent [19]
Brown

[11] Patent Number: 6,056,309
[45] Date of Patent: May 2, 2000

[54] CONVERTER DOLLY WITH ADJUSTABLE FIFTH WHEEL AND AXLE ASSEMBLY FOR USE IN MULTIPLE TRAILER RIGS

[75] Inventor: Scott T. Brown, Boring, Oreg.

[73] Assignee: Silver Eagle Manufacturing Company, Portland, Oreg.

[21] Appl. No.: 09/022,589

[22] Filed: Feb. 12, 1998

[51] Int. Cl.[7] .................................................. B60D 13/00
[52] U.S. Cl. .......................................................... 280/447
[58] Field of Search ........................... 280/476.1, 438.1, 280/407, 433, 405.1, 410, 408, 412, 411.1, 423.1, 446.1, 447, 456.1, 482

[56] References Cited

U.S. PATENT DOCUMENTS

| | | | |
|---|---|---|---|
| 2,189,170 | 2/1940 | Gaussoin | 280/123 |
| 2,872,208 | 2/1959 | Bennett et al. | 280/116 |
| 3,476,405 | 11/1969 | Cunha | 280/415 |
| 3,484,852 | 12/1969 | Norrie et al. | 280/476 |
| 3,764,164 | 10/1973 | Lankenau | 280/415 B |
| 4,759,563 | 7/1988 | Nash | 280/423 A |
| 5,338,050 | 8/1994 | Haire et al. | 280/476.1 |

OTHER PUBLICATIONS

"Utility Converter Dollies" Advertisement; Utility Trailer Manufacturing Company; one page, (Undated).

"General Log Trailer SK–2" Advertisement and side elevational drawing; General Trailer Company; 3 pages, (Undated).

*Primary Examiner*—Christopher P. Schwartz
*Assistant Examiner*—C. T. Bartz
*Attorney, Agent, or Firm*—Stoel Rives LLP

[57] ABSTRACT

A semi-trailer converter dolly having a dolly wheel axle assembly and a fifth wheel assembly is provided with a mounting assembly for convenient adjustment of the distance between adjacent trailers to optimize the load distribution, maneuverability, and aerodynamics of the trailer rig. The mounting assembly includes mounting brackets that support and interconnect the dolly wheel axle assembly and the fifth wheel assembly for concurrent adjustment of the dolly wheel axle assembly and the fifth wheel assembly along the converter dolly.

11 Claims, 9 Drawing Sheets

CONVERTER DOLLY WITH ADJUSTABLE FIFTH WHEEL AND AXLE ASSEMBLY FOR USE IN MULTIPLE TRAILER RIGS

TECHNICAL FIELD

The present invention relates to tandem trailer arrangements in which multiple trailers are pulled by a single truck tractor and, in particular, to a trailer converter dolly that includes a carriage assembly mounted for convenient adjustment of the distance between adjacent trailers to optimize the load distribution, maneuverability, and aerodynamics of the trailer rig.

BACKGROUND OF THE INVENTION

Tandem trailer arrangements are commonly used with semi-tractor trailer rigs, usually when two or three trailers are towed by a single truck tractor. In operation, a first trailer is connected to the truck tractor using a conventional kingpin and fifth wheel arrangement. A second, tandem trailer is conventionally coupled to the first, lead trailer using a converter dolly carrying a second fifth wheel. The second fifth wheel is pivotally connected to a kingpin mounted on the second trailer, and a hitch at the rear end of the first trailer is pivotally connected to a drawbar eye at the forward end of a drawbar assembly forming the forward portion of the converter dolly. In a three-trailer rig, a second converter dolly couples a third trailer to the second trailer.

A problem with tandem arrangements is that a large gap between adjacent trailers in a multiple trailer rig increases the aerodynamic drag of the rig, which reduces fuel economy. However, if the adjacent trailers are attached too close to each other, they will interfere with each other during turning maneuvers such as those encountered in city driving. In addition, highway regulations require minimum spacing between axles for adequate load distribution on vehicles travelling over bridges. Thus, the distance between trailers must be optimized to reduce aerodynamic drag without violating load distribution regulations or affecting the ability of the rig to maneuver around tight corners.

For a converter dolly having a fixed distance between the drawbar eye and the fifth wheel, two dimensions control the distance between trailers. The first dimension is the distance between the hitch on the lead trailer and the rear end of the lead trailer. The second dimension is the distance between the forward end of the tandem trailer and its kingpin. Because these two dimensions often vary between trailer models, there is a need for a converter dolly in which the distance between the drawbar eye and the fifth wheel can be conveniently established during the manufacture of the dolly and adjusted after the dolly has been assembled to establish the spacing between adjacent trailers for optimized load distribution, maneuverability, and aerodynamics of the trailer rig.

In conventional converter dollies, the fifth wheel assembly and a suspension mechanism supporting a converter dolly axle assembly are welded in position on a frame that is connected to the drawbar assembly at a fixed distance from the drawbar eye. In order to provide a wide variety of length and hitch height configurations, conventional dollies must be manufactured in a wide variety of drawbar and frame configurations. After a conventional converter dolly has been assembled and welded together, its length can be changed only by cutting the fifth wheel assembly from the frame with a cutting torch and re-welding the fifth wheel assembly at a new position on the frame, or by cutting the drawbar assembly from the frame and welding in its place a drawbar assembly of different length. A similar procedure must be followed to change the drawbar eye height. Cutting the dolly and rewelding it is an undesirable adjustment procedure because it is time consuming and weakens the frame.

When changing the position of the fifth wheel, it is also desirable to adjust the position of the axle assembly to maintain its alignment with the fifth wheel so that the converter dolly pivots at the kingpin relative to the tandem trailer. Misalignment of the dolly axle and the kingpin results in undesirable lateral movement of the forward end of the tandem trailer relative to the dolly axle when pivoting during turning maneuvers. Misalignment also places the tandem trailer load forward or aft of the axle and wheels of the dolly and thereby increases the stress on its frame and the wear on the drawbar eye and trailer hitch. Further, if the fifth wheel assembly is improperly located aft of the axle on a conventional dolly, the dolly tracks in an unstable manner as a consequence of compression of the axle suspension, which causes the axle and wheels to wander laterally. To overcome this instability, the fifth wheel on a conventional dolly is typically located one to three inches forward of the axle so that the axle and wheels follow the trailer load and thereby apply tension to the suspension so that the dolly wheels track a stable course.

In a conventional converter dolly, a substantial portion of the frame is occupied by the suspension mechanism that supports the axle assembly, leaving little space available for adjustment of the position of the suspension mechanism along the frame. Thus, the limited range of adjustment of the suspension mechanism effectively restricts the amount of adjustability of the distance between the drawbar eye and the fifth wheel assembly. An additional disadvantage is that the axle assembly and suspension must be cut from the frame with a cutting torch and rewelded in the same manner as the fifth wheel assembly.

One design for an adjustable length converter dolly is described in U.S. Pat. No. 5,338,050 of Haire et al. This converter dolly has a single telescoping drawbar fitted within a sleeve on the frame. The drawbar has a number of holes evenly spaced along its length for drawbar adjustment. Two pneumatic cylinders mounted on the sleeve actuate two pins to couple a pair of holes in the sleeve with a pair of the holes in the drawbar. One disadvantage of this converter dolly is the expense stemming from the use of pneumatic cylinders, switching equipment for controlling the pneumatic cylinders, and equipment for supplying compressed air to the cylinders. In addition, the single drawbar arrangement must be constructed of more massive members than those of a conventional drawbar assembly to overcome an inherent weakness in the drawbar where the pins couple the drawbar to the sleeve. The increased mass of the single drawbar design results in higher manufacturing costs and a heavier rig. This design cannot accommodate different hitch heights without tilting the dolly frame, and requires the drawbar to extend horizontally to prevent the dolly from tilting when changing the drawbar length. Lastly, the single drawbar configuration has less space available for holding air brake equipment, electrical cables, and auxiliary equipment such as a swivel jack for use during storage of the converter dolly.

SUMMARY OF THE INVENTION

An object of the invention is, therefore, to provide an economical converter dolly having a drawbar eye and a fifth wheel assembly separated by a distance that is easily adjustable for accommodating different tandem trailer pairs.

Another object of the invention is to provide such a converter dolly of a modular construction that reduces manufacturing costs by using substantial number of common components to manufacture a wide variety of height and length configurations, and that may be adjusted after assembly without requiring the use of a cutting torch or welding equipment.

A further object of the invention is to provide such a converter dolly having a frame with removable side members for easy replacement with side members of a different length to vary the overall length of the frame and the range of adjustment.

Yet another object of the invention is to provide such a converter dolly with an adjustable fifth wheel assembly that is maintained in a centered alignment, throughout its range of adjustment, over a frame-mounted dolly wheel axle to limit lateral movement of the trailer during turning maneuvers and to improve the load distribution, tracking stability, and handling characteristics of the converter dolly.

Still another object of the invention is to provide a converter dolly that is of simple and rugged construction, capable of withstanding, without degradation in performance, the handling which converter dollies are subjected and the environment to which converter dollies are exposed.

The present invention is a semi-trailer converter dolly that includes a frame connected near its forward end to a pair of drawbars extending from the forward end in the direction of forward travel of the dolly and converging at a drawbar eye for connection to a lead trailer hitch positioned at the rear end of a lead trailer. The frame includes a pair of elongate side members spaced apart by a forward cross member and a rear cross member. Mounting brackets are removably fastened to the side members for adjustably mounting a dolly wheel axle assembly and a suspension. The axle assembly and the suspension are arranged in a generally vertical plane and extend between the side members for connection to the mounting brackets. A fifth wheel assembly is supported by the suspension for rotatably connecting to a kingpin projecting downwardly beneath the front end of a tandem trailer.

For ease of adjustment, the mounting brackets are removably fastened to the side members through holes drilled in the mounting brackets and the side members. The side members are formed of C-shaped beams, each beam including a web oriented in a vertical plane and a pair of sidewalls extending from the web toward the other beam. The mounting brackets include inner supports fitted between the pairs of sidewalls and outer supports positioned adjacent the webs opposite the inner supports. The dolly wheel axle assembly is positioned beneath the side members and is removably fastened to the inner supports and the outer supports to establish a rigid connection between the dolly wheel axle assembly and the frame. The dolly wheel axle assembly includes hubs positioned laterally beyond the side members of the frame at the ends of the axle assembly for mounting wheels. The modular construction of the frame and the ability to adjustably position the mounting brackets along the side members facilitates manufacturability by reducing the number of different drawbar designs necessary to accommodate a variety of different trailer hitch height and trailer spacing configurations.

The mounting brackets include spring plates positioned on top of the side members, the inner supports, and the outer supports to provide a solid, flat surface for mounting the suspension. The suspension includes leaf spring assemblies extending between the mounting brackets and seated at each end within boot housings positioned above the spring plates and removably fastened to the spring plates, the inner supports, and the outer supports. The boot housings capture boot rubbers against the spring plates for holding the ends of the leaf spring assemblies within the boot housings. U-bolts clamp a pressure plate and the fifth wheel assembly to the leaf spring assemblies medially of the side members. The suspension and fifth wheel are aligned in a vertical plane intersecting the axle assembly so that the tandem trailer does not move laterally relative to the dolly during turning maneuvers and to center the weight of the tandem trailer over the wheels to facilitate maneuverability and stability, trailer coupling, and trailer decoupling.

The frame is assembled with removable fasteners to facilitate manufacturability and to enable the length of the dolly to be modified by replacing the side members. Corner braces welded to the ends of the drawbars opposite the drawbar eye are removably fastened to the ends of the front cross member and to the forward ends of the side members. The rear cross member is removably fastened to the rear ends of the side members and includes a hinge for attaching a tilt stop. The tilt stop counterbalances the weight of the drawbars and provides a stand for the frame which limits the extent to which the dolly is able to tilt during manual handling of the dolly and in other situations where the dolly is not connected to a trailer. The tilt stop has an added benefit of blocldng tire spray that occurs during wet road conditions. Conventional running equipment, such as tail lights, pneumatic braking equipment, and safety cables, is also mounted to the rear cross member.

In another embodiment of the invention, the mounting brackets include C-shaped outer supports positioned adjacent the side members so that the outer supports cradle the side members. Four spring hangars are connected to the outer supports, two on each outer support, for supporting two axle suspension assemblies on the outer supports. The axle assembly is positioned beneath the frame and clamped to the axle suspension assemblies. The fifth wheel assembly includes a fifth wheel mounting plate connected to the mounting brackets.

Additional objects and advantages of this invention will be apparent from the following detailed description of preferred embodiments thereof which proceeds with reference to the accompanying drawings.

DETAILED DESCRIPTION OF PREFERRED EMBODIMENTS

Figure 1:
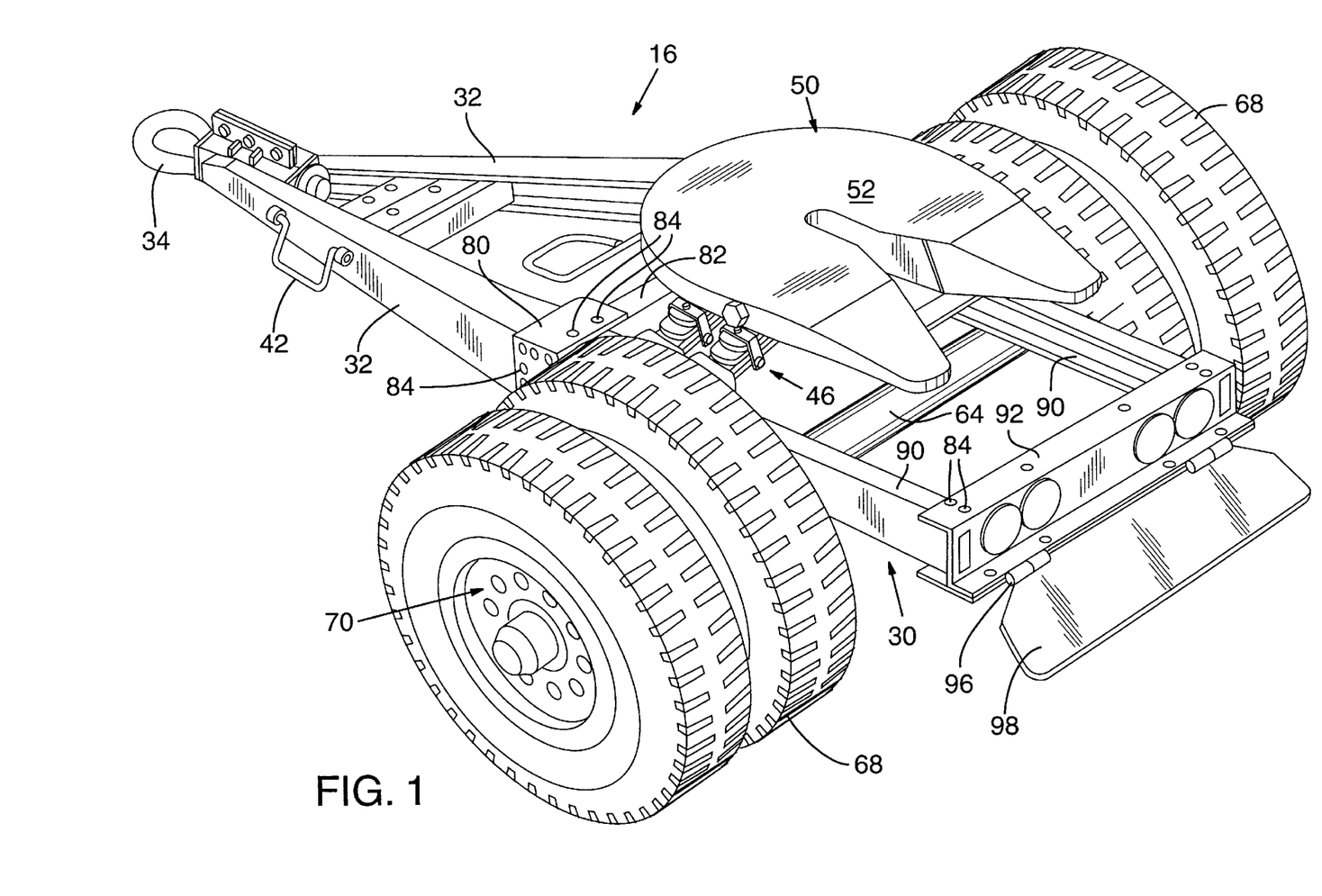
FIG. 1 is a perspective view of a converter dolly in accordance with the present invention.
Figure 2:
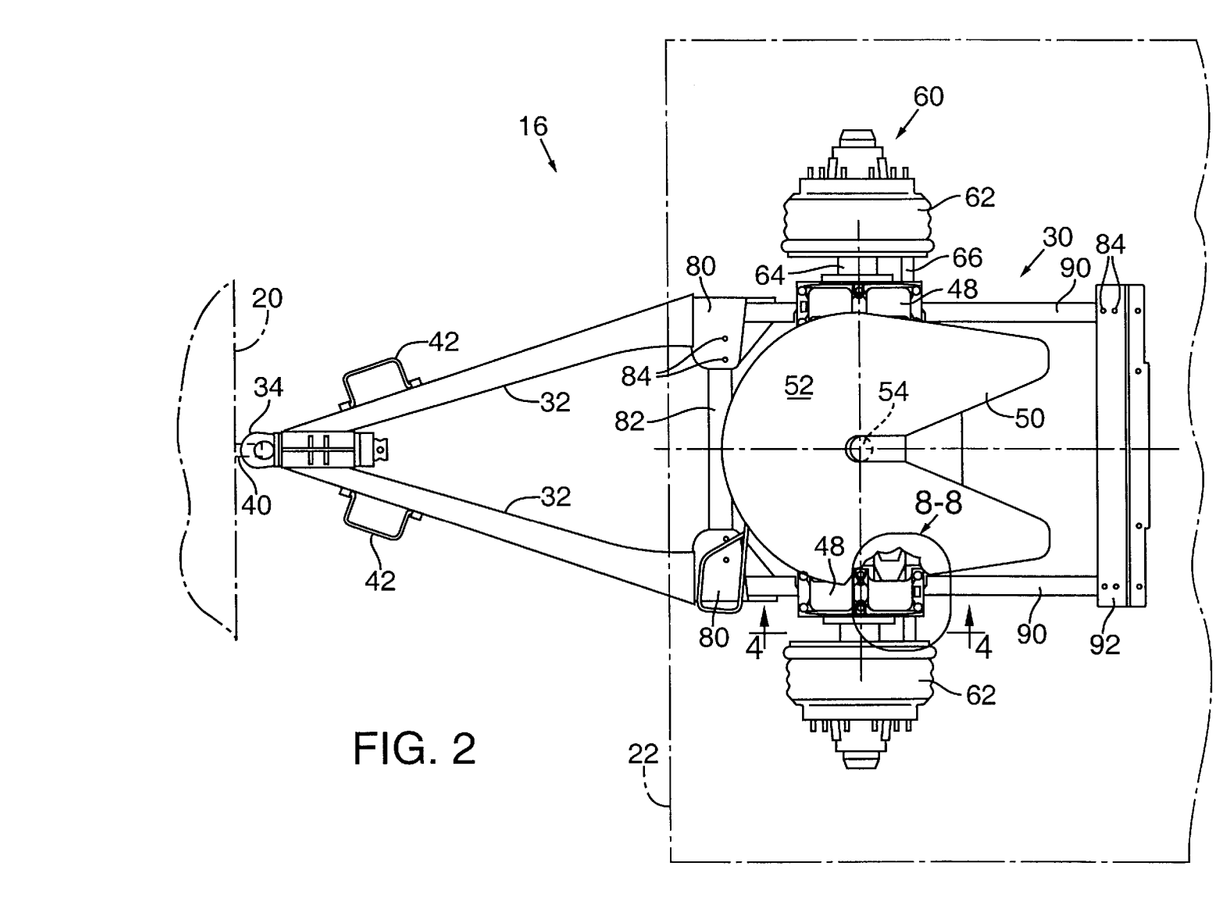
FIG. 2 is a plan view of the converter dolly of FIG. 1 with wheels and tires removed and trailers shown in phantom lines.
Figure 3:
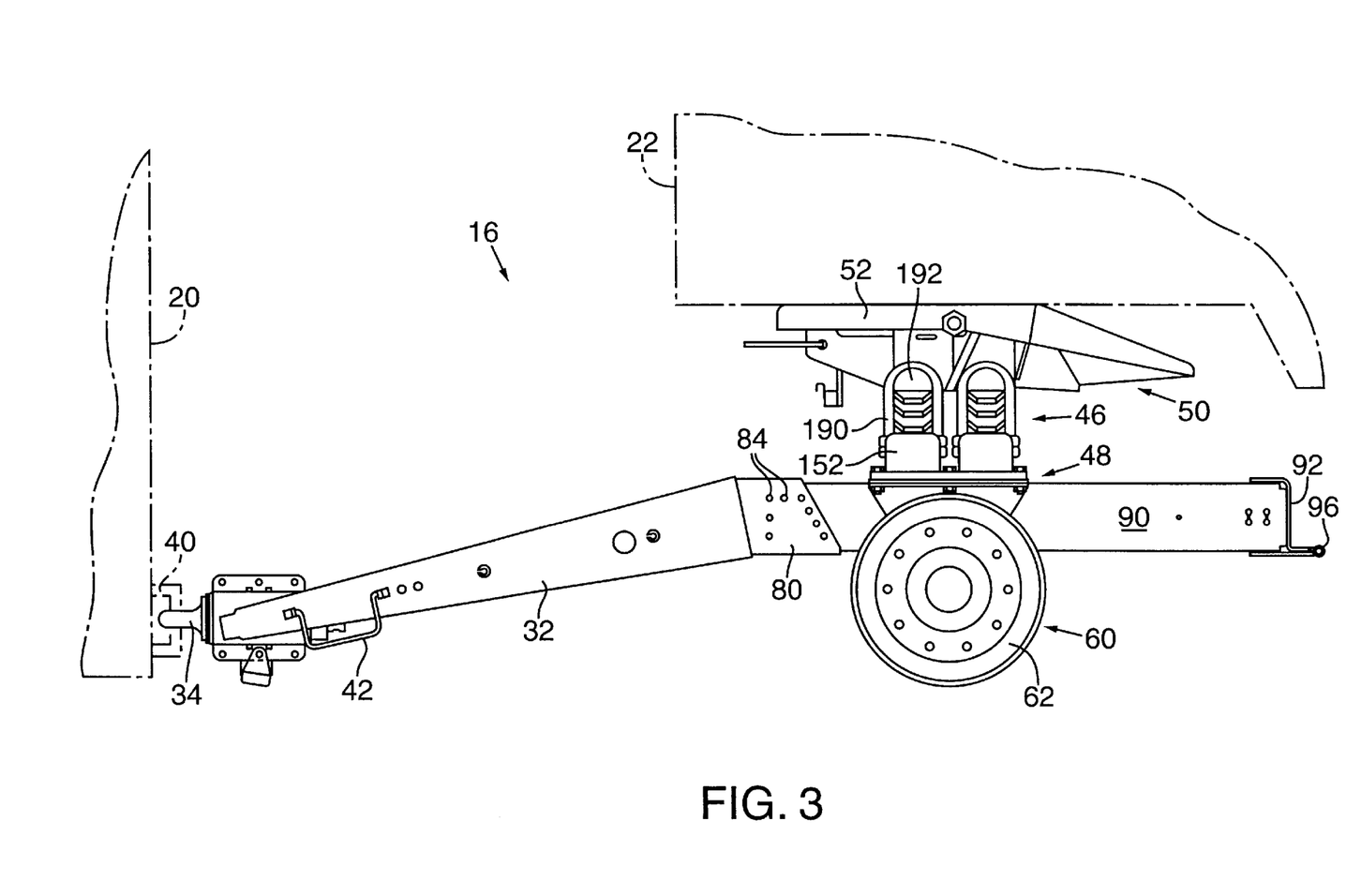
FIG. 3 is a side elevation view of the converter dolly of FIG. 2.

FIG. 1 shows a pictorial view of a converter dolly 16, which represents a first preferred embodiment of the present invention. FIGS. 2 and 3 show respective plan and side elevation views of converter dolly 16 coupling a lead trailer 20 to a tandem trailer 22. With reference to FIGS. 1–3, converter dolly 16 includes a generally rectangular frame 30 connected to a pair of drawbars 32 that extend forward from frame 30 to converge at a drawbar eye 34 for connection to lead trailer 20 (FIGS. 2 and 3). Drawbar eye 34 connects to a hitch 40 at the rear end of lead trailer 20 such that converter dolly 16 is free to pivot about hitch 40 in the horizontal plane during turns and vertically when traveling over uneven terrain. Drawbars 32 are shown in FIG. 3 angled downward toward drawbar eye 30 for connection to a lead trailer 20 of the drop-deck type. However, drawbars 32 may extend from frame 30 at whatever angle is necessary to connect to the particular type of lead trailer 20 and height of hitch 40 in use. Handles 42 attached to the sides of drawbars 32 facilitate manual lifting of drawbars 32 and drawbar eye 34 for connection to hitch 40. Lead trailer 20 may be a trailer connected to a truck tractor (not shown) using a conventional fifth wheel and kingpin arrangement commonly known in the art, or it may be a trailer integral with a truck chassis.

A dual leaf spring suspension 46 is connected at each end to two mounting brackets 48 mounted on either side of frame 30. Suspension 46 supports a fifth wheel assembly 50, which includes a fifth wheel plate 52 for receiving a kingpin 54 that is mounted on and extends downwardly from beneath tandem trailer 22 near its forward end. In operation, kingpin 54 is coupled to fifth wheel assembly 48 so that tandem trailer 22 pivots relative to converter dolly 16 during turning maneuvers. When tandem trailer 22 is coupled to converter dolly 16, the weight of tandem trailer 22 rests upon fifth wheel plate 52.

An axle assembly 60 is positioned under frame 30 and mounted to mounting brackets 48. Axle assembly 60 terminates in hub assemblies 62, which are rotatable about axle 64. Conventional drum brakes (not shown) are included in hub assemblies 62 and connected to brake controls (not shown) by two brake cam shafts 66. Tires 68 (FIG. 1) are mounted on wheels 70 and connected to hub assemblies 62 (FIGS. 2 and 3) for supporting the weight of tandem trailer 22 against a road surface (not shown).

To provide a strong connection between drawbars 32 and frame 30, two corner braces 80 are welded to the ends of drawbars 32 opposite drawbar eye 34. Corner braces 80 are removably fastened to a forward cross member 82 using fasteners 84. Two side members 90 are oriented generally parallel to each other and removably fastened at one end to corner braces 80 and at the other end to a rear cross member 92 using fasteners 84. Fasteners 84 are preferably standard hexagonal nuts and bolts. Rear cross member 92 includes a hinge 96 for mounting a tilt stop 98 (FIG. 1) for counterbalancing the weight of drawbars 32. Tilt stop 98 limits the extent to which converter dolly 16 can tilt during manual handling of the dolly and serves as a stand for use during repairs and servicing of converter dolly 16. Tilt stop 98 has the added benefit of blocking tire spray occurring during wet road conditions. Mud flaps (not shown) may also be mounted to rear cross member 92 for blocking tire spray.

The modular construction of converter dolly 16 and the ability to selectively position mounting brackets 48 along side members 90 during manufacture of the converter dolly 16 reduce manufacturing costs. Hitch 40 on lead trailer 20 is typically positioned at one of a small number of known standard heights. To provide a selection of dollies for coupling trailers with the standard hitch heights, a manufacturer of converter dolly 16 need only manufacture and inventory a small number of different drawbars 32. In addition, the modular construction of converter dolly 16 facilitates retrofitting different drawbars 32 to frame 30 if it is desired to place converter dolly 16 into use with a lead trailer 20 having a hitch 40 of a different height from that which converter dolly 16 was originally manufactured to fit.

Similarly, a range of distances between drawbar eye 34 and fifth wheel assembly 50 may be readily manufactured to optimize spacing between adjacent trailers 20 and 22 of various lengths, without requiring the manufacturer to make and inventory a large number of different components. Removably fastening mounting brackets 48 at a desired position along side members 90 establishes the distance between drawbar eye 34 and fifth wheel assembly 50 during manufacture. In conventional dollies (not shown), the distance between the drawbar eye and the fifth wheel assembly is changed by cutting the drawbar assembly from the frame and welding a drawbar assembly of a different length. In some configurations, the drawbar assembly is not horizontal because the height of the hitch is different from the height of the frame. In these configurations, the drawbar assembly is attached at an angle so that the height of the drawbar eye matches the height of the hitch. In conventional dollies, the angle of the drawbar assembly is changed when the length of the drawbar is changed in order to maintain the height of the drawbar eye. Unlike conventional dollies, the distance between drawbar eye 34 and fifth wheel assembly 50 is easily changed without the use of a cutting torch or welding equipment after the manufacture of converter dolly 16, and without changing the length of drawbars 32 or the height of drawbar eye 34. Further, the overall length of the converter dolly 16 and the range of adjustment of mounting brackets 48 may be changed without affecting the height of drawbar eye 34 by replacing side members 90 with side members of a different length.

Figure 4:
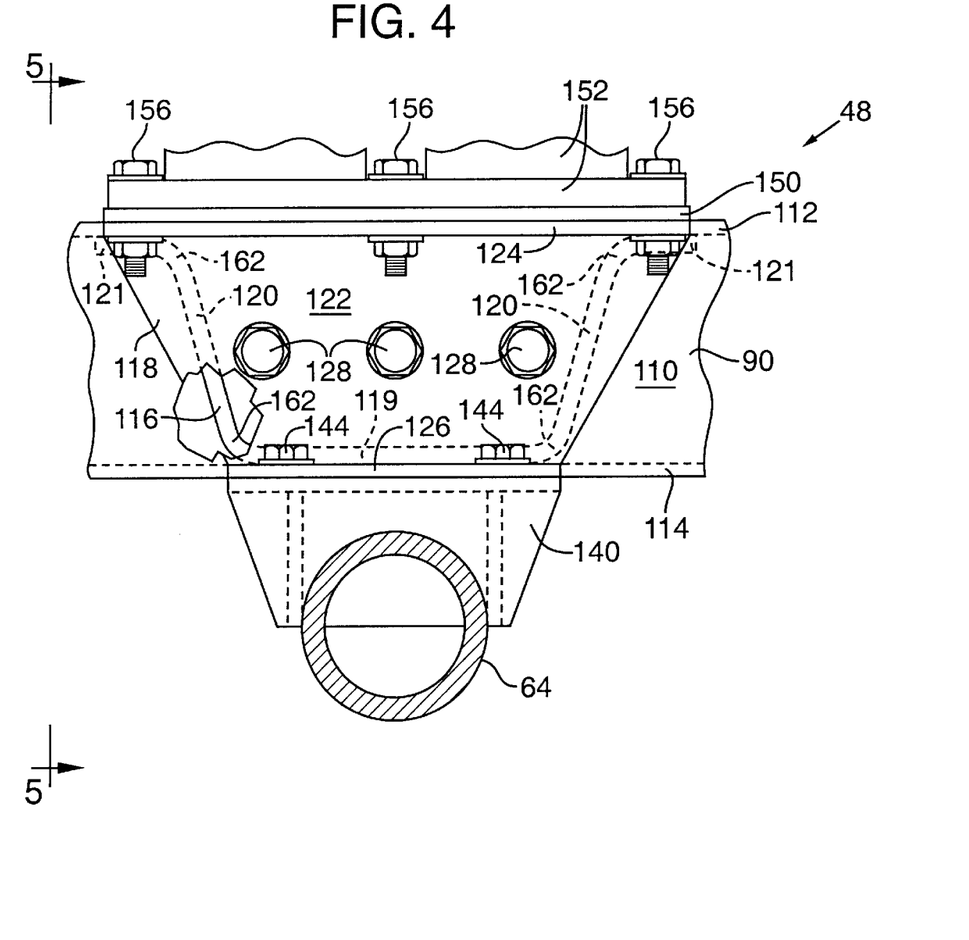
FIG. 4 is an enlarged, fragmentary sectional view taken along line 4—4 of FIG. 2 to show the outer side of a mounting bracket of the converter dolly.
Figure 5:
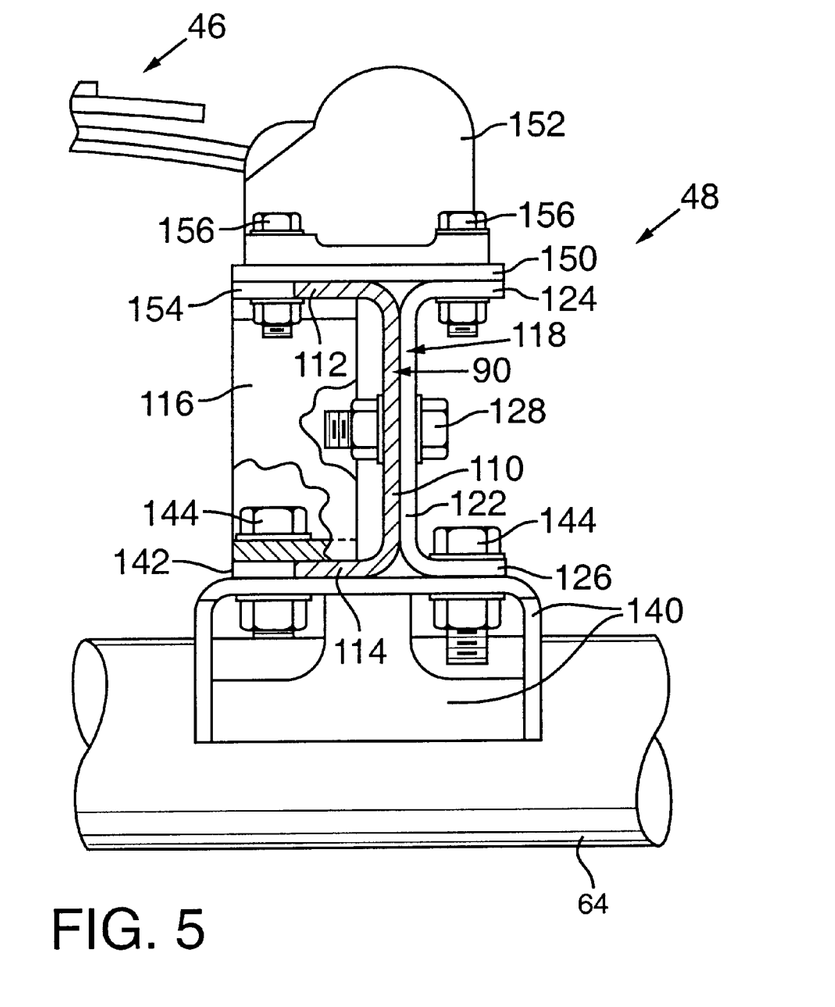
FIG. 5 is an enlarged, fragmentary sectional view taken along line 5—5 of FIG. 4 to show the forward end of the mounting bracket.

FIG. 4 is an enlarged sectional view taken along line 4—4 of FIG. 2 and shows side view detail of one of the mounting brackets 48. Mounting brackets 48 are mirror images of each other. FIG. 5 is a sectional view taken along line 5—5 of FIG. 4, and shows end view detail of one of the mounting brackets 48. With reference to FIGS. 4 and 5, side member 90 is a C-shaped beam that includes a web 110 oriented in a generally vertical plane, and an upper sidewall 112 and a lower sidewall 114 both extending generally horizontally from web 110 toward fifth wheel assembly 50 (FIG. 1). Mounting bracket 48 includes an inner support 116 fitted between sidewalls 112 and 114, and an outer support 118 positioned adjacent side member 90 opposite inner support 116.

Figure 6:
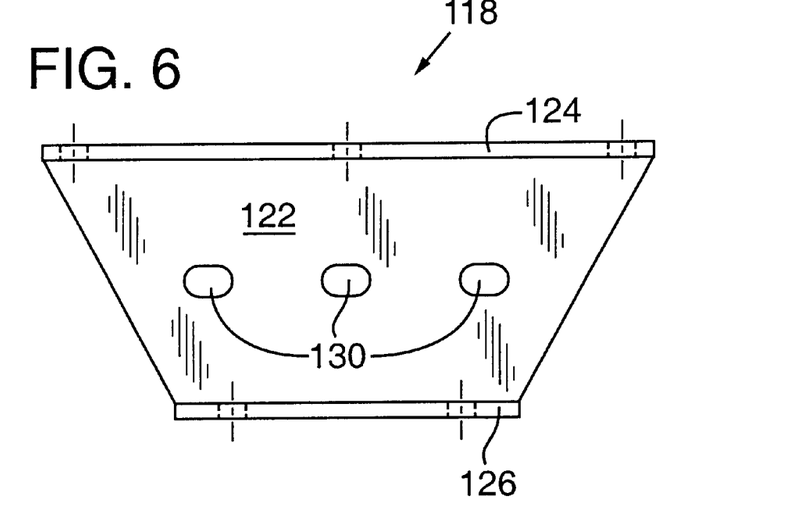
FIG. 6 is an enlarged, side elevation view of the outer support of the mounting bracket of FIG. 4.
Figure 7A:
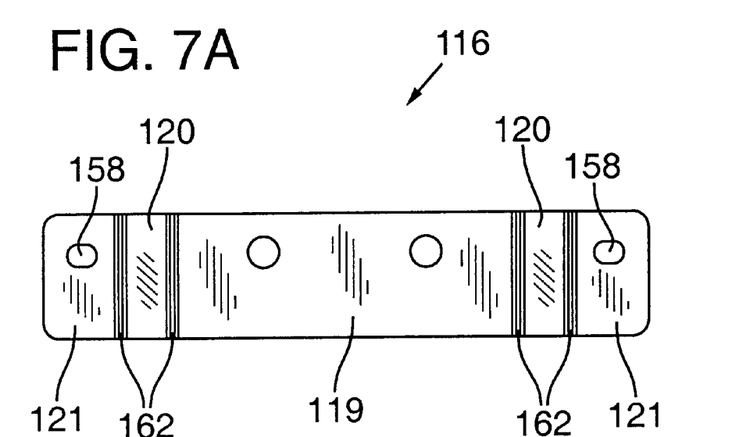
FIG. 7A is an enlarged, plan view of the inner support of the mounting bracket of FIG. 4.

FIG. 6 is an enlarged side elevation view of outer support 118. FIG. 7A is an enlarged plan view of inner support 116. With reference to FIGS. 4, 5, 6, and 7A, inner support 116 includes a base portion 119, and two legs 120 extending from base portion 119 and terminating in feet 121. Outer support 118 includes a vertical portion 122 positioned adjacent web 110 and respective upper and lower horizontal portions 124 and 126 extending generally horizontally away from web 110. Three mounting bolts 128 extend through positioning slots 130 in vertical portion 122 (FIG. 6), which are aligned with positioning holes (not shown) in side member 90 to connect outer support 118 to side member 90. The length of positioning slots 130 is approximately 0.5 inch greater than their width to facilitate accurate alignment of axle assembly 60 relative to frame 30.

An axle weldment 140 is welded to axle 64 for supporting axle 64 beneath side member 90. A lower spacer 142 of approximately the same thickness as lower sidewall 114 is positioned beyond the end of the lower sidewall 114 between base portion 119 of inner support 116 and axle weldment 140. Axle mounting bolts 144 connect one side of axle weldment 140 to lower horizontal portion 126 and the other side of axle weldment 140 to lower spacer 142 and base portion 119.

A spring plate 150 is positioned on top of side member 90, inner support 116, and outer support 118 and provides a solid, flat surface for mounting a double boot housing 152. An upper spacer 154 of approximately the same thickness as that of upper sidewall 112 is positioned beyond the end of upper sidewall 112 between spring plate 150 and feet 121 of inner support 116. Suspension mounting bolts 156 connect one side of double boot housing 152 to spring plate 150 and outer support 118, and the other side of double boot housing 152 to spring plate 150, upper spacer 154, and inner support 116. Suspension mounting bolts 156 extend through holes (not shown) in double boot housing 152, spring plate 150, and upper spacer 154, and through suspension mounting slots 158 in feet 121 (FIG. 7A). Suspension mounting slots 158 are approximately 0.25 inch longer than they are wide to accommodate manufacturing variability. Bends 162 (FIGS. 4 and 7A) form angles of approximately 106-degrees in inner support 116 between feet and legs and between base portion and legs. Bends 162 are compliant areas which, in conjunction with suspension mounting slots 158, allow inner support 116 to flex so that inner support 116 is maintained in contact with upper and lower sidewalls 112 and 114 when inner support 116 is securely fastened to axle weldment 140 and double boot housing 152 as described above.

Figure 7B:
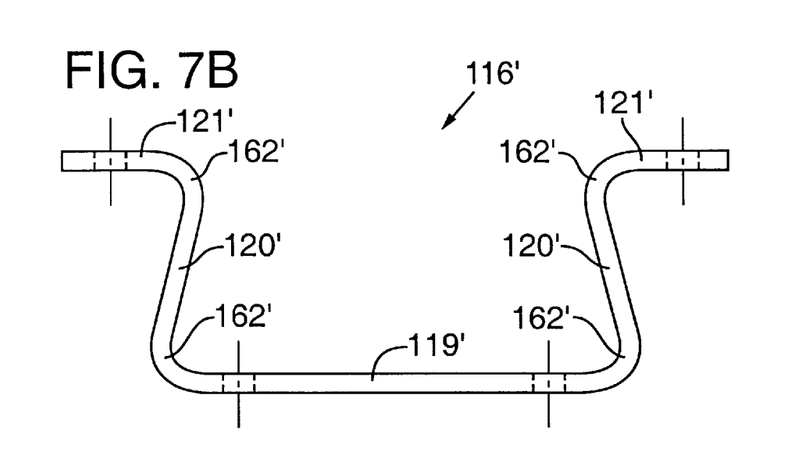
FIG. 7B is an enlarged, side elevation view of an alternate embodiment of the inner support.

FIG. 7B is an enlarged, side elevation view of a second embodiment of inner support 116'. With reference to FIG. 7B, inner support 116' includes base portion 119' having a length that is greater than the distance between feet 121'. Bends 162' form angles of approximately 76-degrees between base portion 119' and legs 120', and between legs 120' and feet 121'. Inner support 116 may take shapes other than shown in FIGS. 4, 5, 6, 7A, and 7B, provided that bends 162 form angles of significantly greater or less than 90-degrees to provide compliant areas for maintaining inner support 116 in contact with upper and lower sidewalls 112 and 114.

By connecting suspension 46 and axle assembly 60 to a single pair of mounting brackets 48, adjustment of the critical length of converter dolly 16 is possible without the use of a metal cutting torch or welding tools. In order to change the distance between drawbar eye 34 and fifth wheel assembly 50, mounting bolts 128 are first removed. Next, axle mounting bolts 144 and suspension mounting bolts 156 are loosened to allow mounting brackets 48 to slide along side members 90. New holes (not shown) are drilled in a new position on web 110 for receiving mounting bolts 128, and mounting brackets 48 are repositioned so that the positioning slots 130 in outer supports 118 are aligned with the new positioning holes in web 110. Mounting bolts 128 are replaced and axle mounting bolts 144 and suspension mounting bolts 156 are tightened. For large adjustments of the position of fifth wheel assembly 50, or to change the overall length of converter dolly 16, mounting brackets 48 can be completely disassembled for replacement of side members 90 with side members of a different length.

Figure 8:
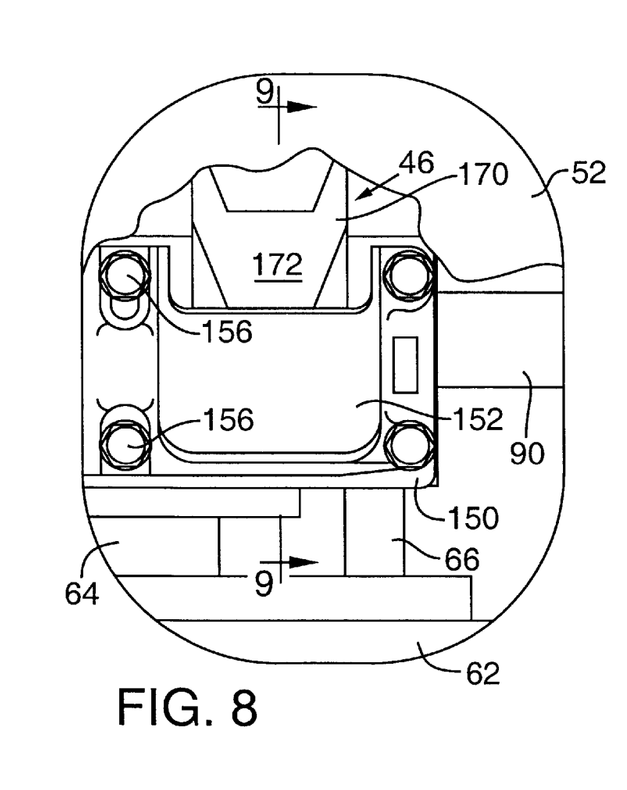
FIG. 8 is an enlargement of the circled cutaway area 8—8 of FIG. 2 showing a plan view of a portion of the suspension of the converter dolly where it connects to the mounting bracket.
Figure 9:
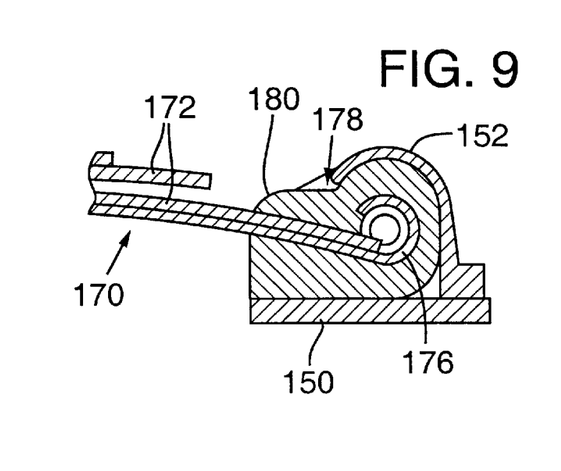
FIG. 9 is an enlarged, fragmentary sectional view taken along line 9—9 of FIG. 8 to show the suspension of the converter dolly.
Figure 10:
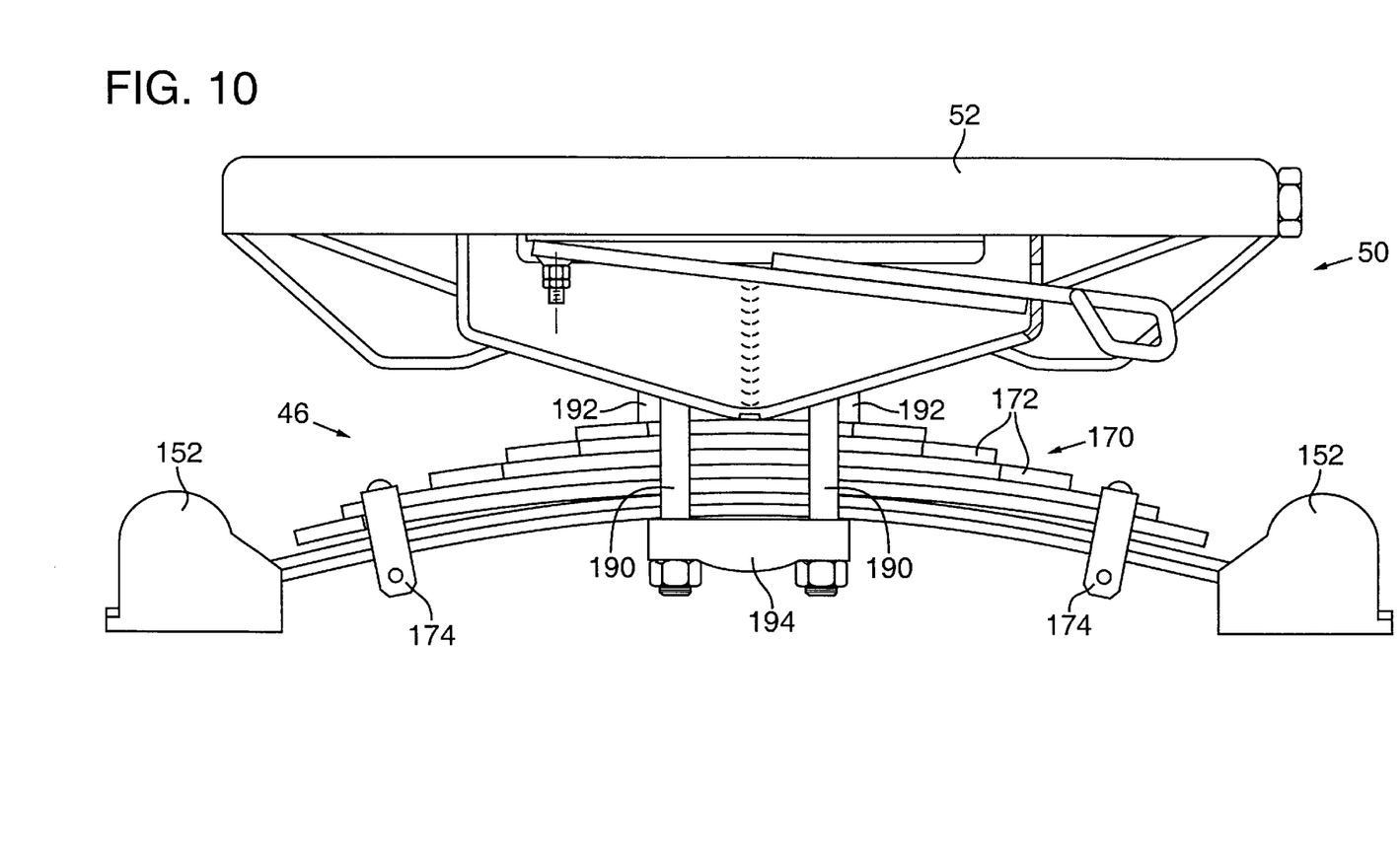
FIG. 10 is a front view of the suspension and fifth wheel assembly of the converter dolly of FIG. 1.

FIG. 8 is an enlargement of circled cutaway area 8—8 of FIG. 1 showing detail of a portion of suspension 46 where it mounts to double boot housing 152, which forms the uppermost portion of mounting bracket 48. FIG. 9 is a sectional view of suspension 46 and double boot housing 152 taken along line 9—9 of FIG. 8. FIG. 10 is a front view of suspension 46 and fifth wheel assembly 50. With reference to FIGS. 8–10, suspension 46 includes two leaf spring assemblies 170 spanning between side members 90. Each leaf spring assembly 170 includes a plurality of leaf spring members 172 held together in a stacked arrangement by two spring clips 174. One of the leaf spring members 172 in each leaf spring assembly 170 includes rolled ends 176 for seating within one of a pair of cavities 178 in each double boot housing 152. Double boot housing 152 captures boot rubbers 180 within cavities 178 and against spring plate 150 for holding rolled ends 176 within cavities 178 and for cushioning leaf spring assemblies 170. U-bolts 190 (FIGS. 3 and 10) are positioned over mounting blocks 192 on fifth wheel assembly 50 and connected on both sides of each of the leaf spring assemblies 170 to a pressure plate 194 positioned beneath leaf spring assemblies 170. In this manner, fifth wheel assembly 50 is clamped in place to leaf spring assemblies 170 near their midpoint such that fifth wheel assembly 50 is resiliently positioned in vertical alignment with axle 64 (FIGS. 2 and 3).

The alignment of fifth wheel assembly 50 with axle assembly 60 ensures that tandem trailer 22 (FIGS. 2 and 3) will not move laterally relative to converter dolly 16 during turning maneuvers. Alignment of fifth wheel assembly 50 and axle assembly 60 also centers the load of tandem trailer 22 over wheels 70 and tires 68 so that minimal stresses are applied to frame 30 and drawbars 32 when tandem trailer 22 is loaded. Centering the load of tandem trailer 22 over wheels 70 also improves the maneuverability of converter dolly 16 and facilitates coupling and decoupling of lead trailer 20 and tandem trailer 22.

Figure 11:
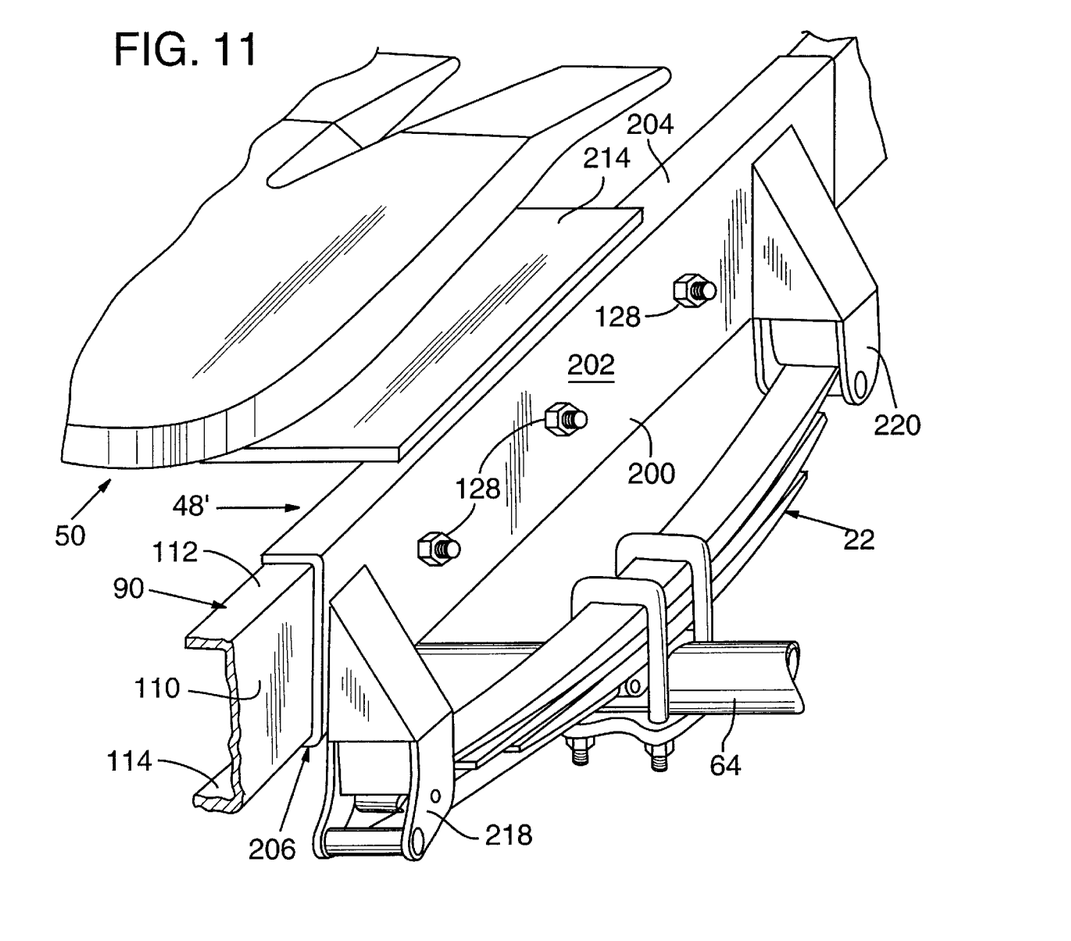
FIG. 11 is a fragmentary perspective view of an alternative embodiment of the converter dolly showing detail of a mounting bracket and the mounting arrangement of a fifth wheel assembly, a suspension, and an axle assembly.

FIG. 11 is a fragmentary perspective view of an alternative embodiment of converter dolly 16 showing one of the mounting brackets 48'. With reference to FIG. 11, mounting bracket 48' includes a C-shaped outer support 200, which cradles one of the side members 90. A second C-shaped outer support (not shown) cradles the other side member. C-shaped outer support 200 includes a vertical wall 202 positioned adjacent web 110, an upper horizontal wall 204 positioned adjacent upper sidewall 112 of side member 90, and a lower horizontal wall 206 positioned adjacent lower sidewall 114 of side member 90. Positioning bolts 128 removably fasten vertical wall 202 of C-shaped outer support 200 to web 110 of side member 90. Second C-shaped outer support is connected to the other side member in the same manner. Fifth wheel assembly 50 is operatively connected to a fifth wheel mounting plate 214, which extends between side members 90 for connection to mounting brackets 48'. A forward spring hangar 218 and a rear spring hangar 220 are welded or fastened to each C-shaped outer support 200 for supporting a conventional axle suspension assembly 222, which is connected at its ends in the conventional manner to spring hangars 218 and 220. A second conventional axle suspension assembly (not shown) is supported by the second C-shaped outer support. Axle 64 is positioned beneath axle suspension assembly 220 and fastened to axle suspension assembly 220 in the conventional manner.

It will be obvious to those having skill in the art that many changes may be made to the details of the above-described embodiments of this invention without departing from the underlying principles thereof. The scope of the present invention should, therefore, be determined only by the following claims.

What is claimed is:

1. A trailer converter dolly for joining adjacent trailers of a multiple trailer semi-tractor-trailer rig for traveling in a direction of travel, the trailer converter dolly comprising:

a frame having a forward end and a rear end and supported on a dolly wheel axle assembly;

a drawbar assembly detachably connected to the frame near the forward end and extending in a direction away from the rear end;

a fifth wheel assembly and suspension mechanism supported on the frame; and a mounting bracket coupled to both the dolly wheel axle assembly and the fifth wheel assembly and detachably connected to the frame for concurrent adjustment of both the dolly wheel axle assembly and the fifth wheel assembly on the frame at selective positions.

2. The converter dolly of claim 1 in which:

the frame includes mounting holes; and the mounting bracket includes fasteners extending through the mounting holes for removably fastening the mounting bracket to the frame.

3. The converter dolly of claim 1 in which:

the frame comprises a first elongate member and a second elongate member, the first and second elongate members spaced apart by a forward cross member and a rear cross member; and the mounting bracket constitutes a first bracket removably fastened to the first elongate member and a second bracket removably fastened to the second elongate member;

the dolly wheel axle assembly and the fifth wheel assembly being operatively connected to the first and second brackets so that the fifth wheel assembly is in a generally vertical alignment with the dolly wheel axle assembly for the concurrent adjustment on the frame.

4. The converter dolly of claim 1 in which:

the elongate member includes a beam having a web oriented in a generally vertical plane and sidewalls extending from the web in a generally horizontal plane; and the mounting bracket includes an inner support occupying space between the sidewalls and an outer support positioned adjacent the web opposite the inner support and releasably fastened to the web, wherein the dolly wheel axle assembly, the suspension mechanism, and the fifth wheel assembly are supported by the outer support.

5. A trailer converter dolly, comprising:

a frame including elongate side members spaced apart by a forward cross member and a rear cross member;

a drawbar assembly detachably connected to the frame near the forward cross member and extending in a direction away from the rear cross member; and mounting brackets for coupling together a dolly wheel axle assembly, a fifth wheel assembly, and a suspension mechanism to be supported on the frame; the mounting brackets being releasably fastened to the side members at a position between the front and rear cross members so that the dolly wheel axle assembly and the fifth wheel assembly extend between the mounting brackets.

6. The converter dolly of claim 5 in which:

the side members include beams, each beam having a web oriented in a generally vertical plane and a pair of sidewalls extending in a generally horizontal plane from the web; and each of the mounting brackets includes an inner support located between the pair of sidewalls and an outer support located adjacent the web opposite the inner support and releasably fastened to the web.

7. The converter dolly of claim 5 in which:

the suspension mechanism includes leaf spring assemblies, each leaf spring assembly being operatively connected to one of the mounting brackets so that the dolly wheel axle assembly extends between and is operatively connected to the leaf spring assemblies and the fifth wheel assembly extends between the mounting brackets.

8. The converter dolly of claim 5 in which the drawbar assembly includes a pair of drawbars removably fastened at one end to the frame near the forward cross member and converging to a drawbar eye in a direction away from the rear cross member.

9. In a trailer converter dolly including a frame having elongate side members spaced apart by a forward cross member and a rear cross member, a fifth wheel assembly, a dolly wheel axle assembly, and a suspension mechanism, a method of adjustably connecting the fifth wheel assembly, the dolly wheel axle assembly and the suspension mechanism along the side members, the method comprising;

providing mounting brackets which include inner supports and outer supports operatively connected adjacently thereto, wherein the inner supports are positioned adjacent the side members;

supporting the dolly wheel axle assembly, the suspension mechanism, and the fifth wheel assembly on the mounting brackets; and releasably fastening the outer supports to the side members at an operating position along the side members.

10. The method of claim 9 in which the side members include beams, each beam having a web oriented in a generally vertical plane and a pair of sidewalls extending from the web in a generally horizontal plane, the inner supports being located between the pair of sidewalls and the outer supports which have mounting holes being located adjacent the web opposite the inner supports; further comprising:

forming positioning holes in the webs of each beam for alignment with the mounting holes, and securing the outer supports to the webs by connecting fasteners through the aligned mounting holes and positioning holes.

11. The method of claim 9 further comprising:

supporting the dolly wheel axle assembly, the suspension mechanism, and the fifth wheel assembly on the mounting brackets in a generally vertical plane of alignment for concurrent adjustment along the side members of the frame.

* * * * *